United States Patent [19]

Penaranda et al.

[11] Patent Number: 5,316,382
[45] Date of Patent: May 31, 1994

[54] ELECTRICALLY DRIVEN HAND MIXER WITH KNIFE-LIKE TOOL INTERLOCK

[75] Inventors: Mariano Penaranda; José Millán; Desiderio Falcó; Josep M. Masip i Balduque, all of Barcelona; Emilio Rodriguez, Cornella, all of Spain

[73] Assignee: Braun Aktiengesellschaft, Frankfurt, Fed. Rep. of Germany

[21] Appl. No.: 920,686

[22] Filed: Jul. 28, 1992

[30] Foreign Application Priority Data

Aug. 13, 1991 [DE] Fed. Rep. of Germany ....... 4126721

[51] Int. Cl.$^5$ .............................................. B01F 13/04
[52] U.S. Cl. .................................. 366/129; 366/601; 200/43.01; 310/68 A
[58] Field of Search ............. 200/43.01, 43.19, 51 R, 200/334; 310/50, 68 A; 366/129, 130, 142, 197, 199, 206, 281-284, 297-301, 342-344, 349, 601

[56] References Cited

U.S. PATENT DOCUMENTS

| 3,299,924 | 1/1967 | Hanschitz | 366/129 X |
| 3,533,600 | 10/1970 | Gerson . | |
| 3,595,093 | 7/1971 | Du Bois . | |
| 3,604,114 | 9/1971 | Swanke . | |
| 4,405,998 | 9/1983 | Brison | 366/343 X |
| 4,850,699 | 7/1989 | Rebordosa | 366/343 X |

FOREIGN PATENT DOCUMENTS

| 1429176 | 5/1963 | Fed. Rep. of Germany . | |
| 1261987 | 3/1966 | Fed. Rep. of Germany . | |
| 2802155 | 1/1978 | Fed. Rep. of Germany . | |
| 3306989A1 | 2/1983 | Fed. Rep. of Germany . | |
| 9006927.7 | 6/1990 | Fed. Rep. of Germany . | |
| 61-176318 | 8/1986 | Japan | 366/343 |
| 61-185232 | 8/1986 | Japan | 366/129 |
| 61-44495 | 10/1986 | Japan | 366/343 |
| 391210 | 4/1965 | Switzerland . | |

OTHER PUBLICATIONS

Krupps, Program '87 (three sheets), month unknown.

Primary Examiner—Harvey C. Hornsby
Assistant Examiner—Charles Cooley
Attorney, Agent, or Firm—Fish & Richardson

[57] ABSTRACT

An electrically driven handmixer comprises a manually actuated electric switching device for an electromotor with several switch steps (I, II, III) for permanent operation of the electromotor as well as at least one switch step (IL) for short-time operation. A coupling device is used for holding and driving various insertable tools, and an interlock ensures that after the insertion of the blending attachment or other knife-like tool into the coupling device, the electromotor remains separated from the power supply despite the activation of the switch steps (I, II, III) for permanent operation of the electromotor, whereas the electromotor remains connected with the power supply during the manual actuation of the switch step (IL) for short-time operation of the electromotor.

12 Claims, 4 Drawing Sheets

ELECTRICALLY DRIVEN HAND MIXER WITH KNIFE-LIKE TOOL INTERLOCK The invention relates to an electrically driven hand mixer for processing foodstuffs, with a manually actuated electric switching device for setting the electric motor into operation, said device having both one as well as several switch steps for the permanent operation of the electric motor as well as at least one switch step during which the electric motor remains in operation (short-time operation) as long as the device is manually activated, further comprising a coupling device for holding and driving various insertable tools, which tools may comprise, for example, dough hooks, beaters or a blending attachment with a rotating knife.

BACKGROUND OF THE INVENTION

Such an electrically driven hand mixer is known, for example, from page 17 of Article No. 726 in connection with Article No. 366 of the current programme/87 of Krups Stiftung & Co. KG, Solingen. When using the Krups 3 Mix 4000 hand mixer in connection with Krups fast blending attachment, it is possible to manually switch on both the switch steps for permanent operation as well as short-time operation. If the switch step for the permanent operation is selected, the knife provided at the free end of the fast blending attachment rotates until the switch in the switch step for permanent operation is brought back to the O-position. If during the permanent operation of the hand mixer it is placed on the working table for a short period by the user, it is possible that, for example, during the permanent operation of the hand mixer a user reaches towards the freely accessible rotating knives, which might lead to severe injuries.

Thus, it is the object of the present invention to create an electrically driven hand mixer in which the use of a fast blending attachment with a knife-like tool only allows switching the switch step for short-time operation, but not the switch steps for permanent operation.

SUMMARY OF THE INVENTION

This object is achieved in accordance with the present invention in that the hand mixer is provided with means which ensure that after the insertion of the blending attachment or other knife-like tools into the coupling device has been carried out, the connection of the electric motor with its power supply is interrupted despite the activation of the switch step for permanent operation. In the event of manual activation of the switch step for short-time operation, however, the electric motor will remain connected with the power supply.

The arrangement in accordance with the invention thus ensures that as soon as a tool provided with a rotating knife is connected with the drive unit of the hand mixer, it is no longer possible to switch on the switch step for permanent operation of the hand mixer by activation of the switch. It is only possible to switch on the hand mixer through the switch step for short-time operation, i.e., as long as the switch for short-time operation is held in its short-time position, the hand mixer remains switched on. As soon as the switch for short-time operation is released by the user, said switch returns to the switch-off position or zero position. In this way it is ensured that unpleasant injuries to the user are prevented, because the instant release of the hand from the switch instantly interrupts the drive of the hand mixer. According to the invention it is therefore possible to switch on the switch steps for permanent operation during the use of the hand mixer with a knife-like tool, but the drive motor will not be activated. Naturally, the invention can also be employed, if so desired, when a dough hook, etc. is used.

The safety device for a hand mixer can be achieved particularly easily if the means consist, among other things, of an electric switch which is closed when a tool is not inserted in the coupling means, said switch being disposed in the electric circuit for the permanent operation of the electric motor and being opened when a blending attachment or any other knife-like tool is inserted into the coupling means.

As soon as a knife-like tool is coupled with the coupling device provided for the drive, an electric switch is actuated by the axial displacement of the tool towards the hand mixer. The switch is thus brought to its opened position, whereupon the switch steps for permanent operation are deactivated and only the switch step for short-time operation is available. This embodiment is particularly simple and can be manufactured with a minimum of effort and expense.

In order to prevent a switched-on hand mixer in permanent operation from beginning to run when a knife-like tool is subsequently coupled with the drive unit, it is preferable in accordance with a further embodiment of the invention that the opening of the switch during the insertion of the knife-like tool takes place before its mechanical connection with the coupling unit. This measure ensures that before the tool is connected with the drive unit of the hand mixer, the switch step for permanent operation is separated from the electric circuit and the motor switches itself off, which ensures that injuries caused during the insertion of the tool in the operating hand mixer are prevented. This safety device can be achieved in a particularly simple way if the tool is provided with a stop which displaces an actuating element provided on the electric switch during the insertion of the tool into the coupling device.

The safety device for an electrically driven hand mixer can be used particularly easily if the tool is a blending attachment consisting of a drive shaft rotatably held in a casing formed in a rod-like manner, said shaft comprising at its one end a gearing for torsionally rigid coupling with the coupling device and at its other end radially extending knife blades, whereby the knife blades are radially outwardly protected by a cover extending in a bell-like manner and being provided on the casing with the stop being formed by a tube-like sleeve encasing the gearing of the drive shaft.

As the blending attachment requires a considerably higher speed as the dough hook, it is preferable that it is coupled at another position than that of the coupling device for the dough hook. The locally separated connecting positions of the blending attachment and the dough hook or beater make it possible that the coupling device provided for the blending attachment is externally accessible via an additional opening provided in the motor casing, and that the opening can be closed by a flap under the force of a spring and that during the insertion of the tool into the opening the flap must be displaced against the force of a spring. During the displacement of the flap it actuates an actuating element of the electric switch. This arrangement therefore provides that as soon as the flap is operated by hand, the switch steps for permanent operation are switched off, i.e., before the blending attachment is inserted into the coupling device of the hand mixer. As the flap is displaceable against the force of a spring, the opening of the coupling device is automatically closed again by this flap when the blending attachment is extracted, whereupon the switch releases the switch steps for permanent operation.

Within the scope of the invention it is naturally also possible that the coupling devices provided for the dough hooks or beaters comprise flaps and cooperate with switches in such a way that, whenever the flaps are closed, only short-time operation of the hand mixer is automatically selectable and whenever at least one of these flaps is opened, the hand mixer switches over to the switch step of permanent operation. In this case the flap on the blending attachment is then no longer required.

To achieve the handling of the hand mixer it is possible that the flap is moved away from the casing of the tool. For example, a ramp may be provided on the flap which is displaced in such a way during the axial displacement of the blending attachment with the flap that the coupling device is released for receiving the blending attachment and that the switch is actuated at the same time. It is, however, also possible that the flap is displaced by hand and that after the insertion of the sleeve with the gearing of the tool into the opening, the sleeve keeps the flap open.

In order to achieve a particularly simple and smooth guidance during the automatic closure of the flap it is preferable if the flap is formed by a slide which is displaceable in a guide bar bracket against the force of a spring laterally to the longitudinal direction of the blending attachment.

It is naturally also possible that instead of the mechanically operable electric switch an electric switch is used which is opened by magnetic forces, whereby said forces are generated by a permanent magnet attached to the respective tool.

BRIEF DESCRIPTION OF THE DRAWINGS

An embodiment of the invention is now outlined in greater detail by reference to the enclosed drawings in which.

DESCRIPTION OF PARTICULAR EMBODIMENT

Figure 1:
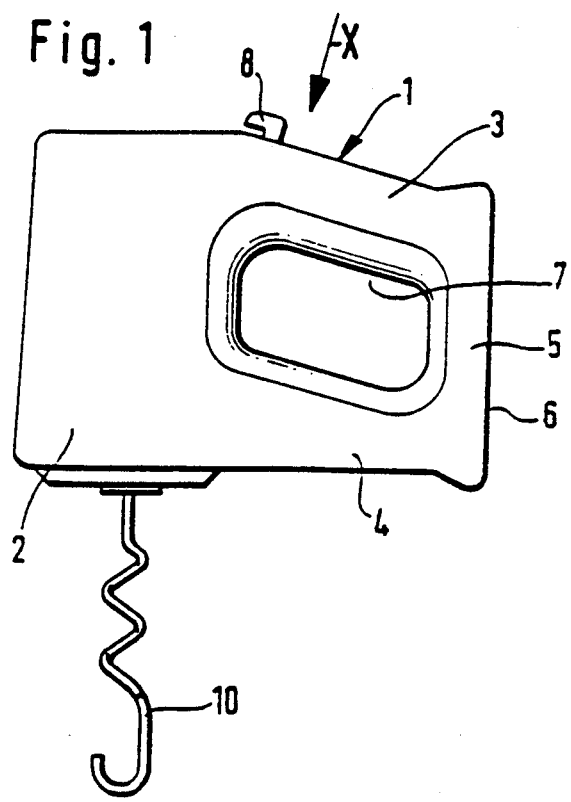
FIG. 1 is a side view of a hand mixer with a dough hook inserted into the coupling device.

FIG. 1 shows a hand mixer 1, substantially consisting of a motor casing 2 provided with a motor (not shown) and an upper and lower arm 3, 4 extending laterally to the motor casing 2, said arms being connected with each other at their free ends through a vertically extending bridge 5 forming a depositing surface 6 for depositing the hand mixer 1. The free space 7 formed by motor casing 2, the arms 3, 4 and the depositing surface 6 are used for receiving a hand that partially grips the upper arm 3 for handling the hand mixer. The actuating member 8 of a five-step switch provided in the upper arm 3 projects from the upper side of upper arm 3. Said switch is indicated in FIG. 7 with reference numeral 9.

Figure 2:
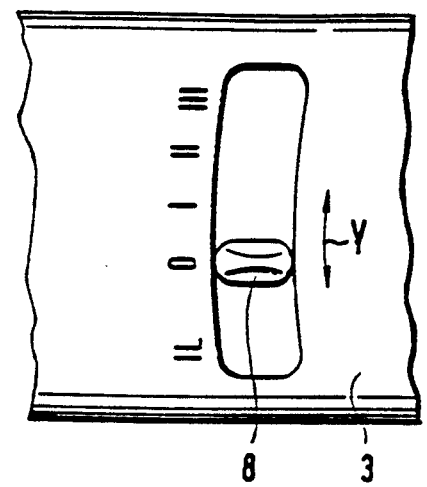
FIG. 2 is a top view of the hand mixer in the direction X of FIG. 1 of the region of the electric switch.
Figure 7:
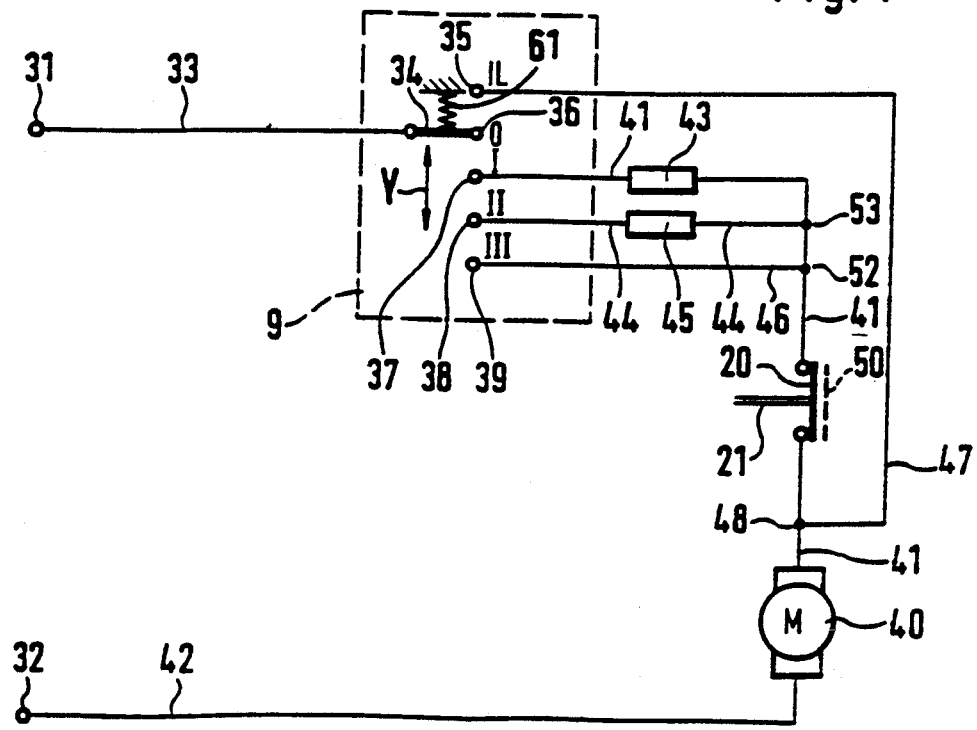
FIG. 7 is a schematic circuit diagram showing the function of the switching device in accordance with the invention.

As is shown in FIG. 2, the actuating member 8 can be moved to its individual switch positions laterally to the longitudinal direction of the upper arm 3, i.e., in the direction Y (also see FIG. 7). In FIGS. 2 and 7 actuating member 8 assumes its O-position, i.e., the hand mixer is out of operation. The upper side of the upper arm 3 indicates the five switch steps by showing position signs, whereby the position sign IL indicates the switch step for short-time operation, the position sign O indicates the switch-off position for the hand mixer and the position signs I to III represent the various speeds of the hand mixer (also see FIG. 7).

Figure 5:
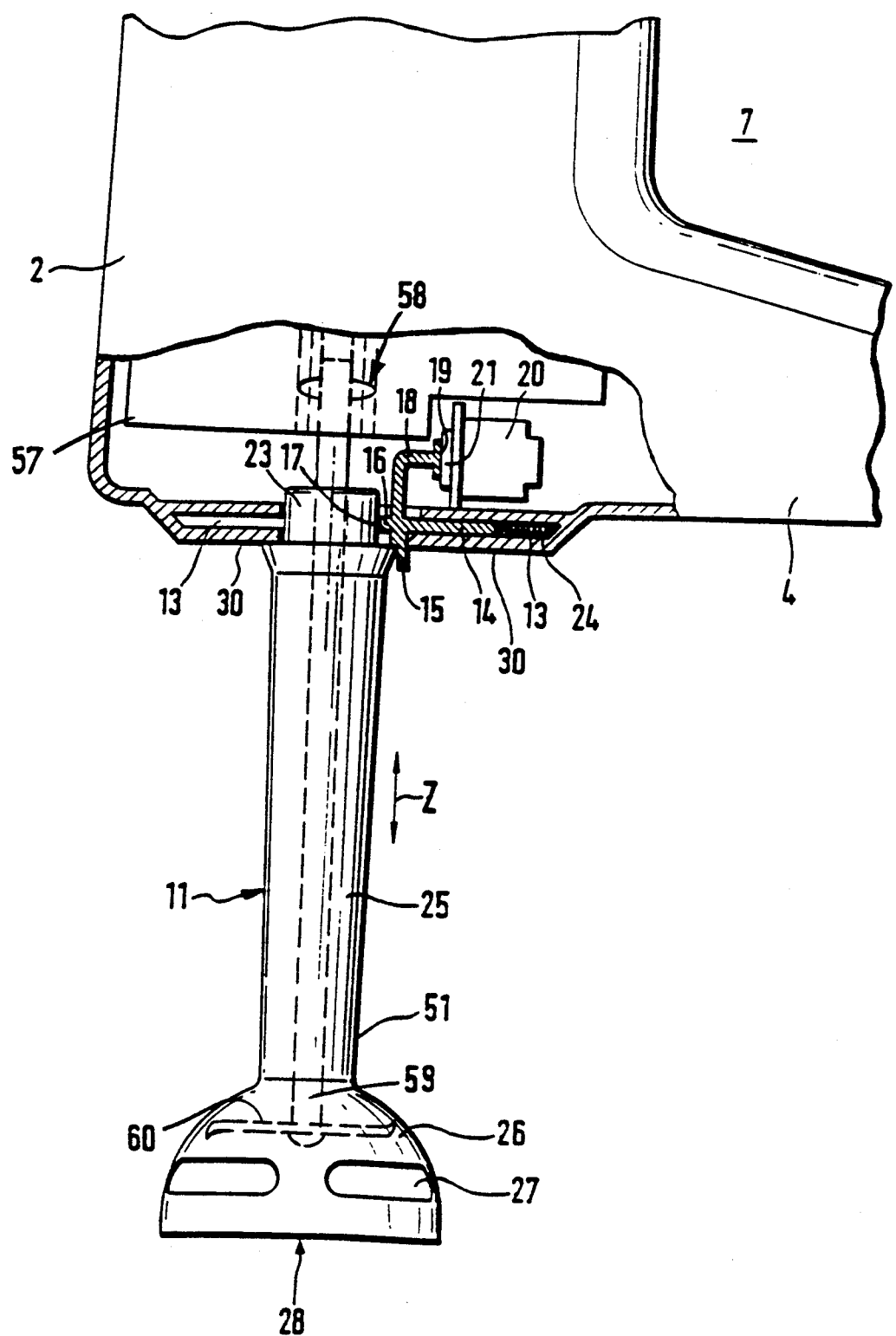
FIG. 5 is a partial longitudinal sectional view as in FIG. 4 with the blending attachment fully inserted into the opening of the casing section.
Figure 6:
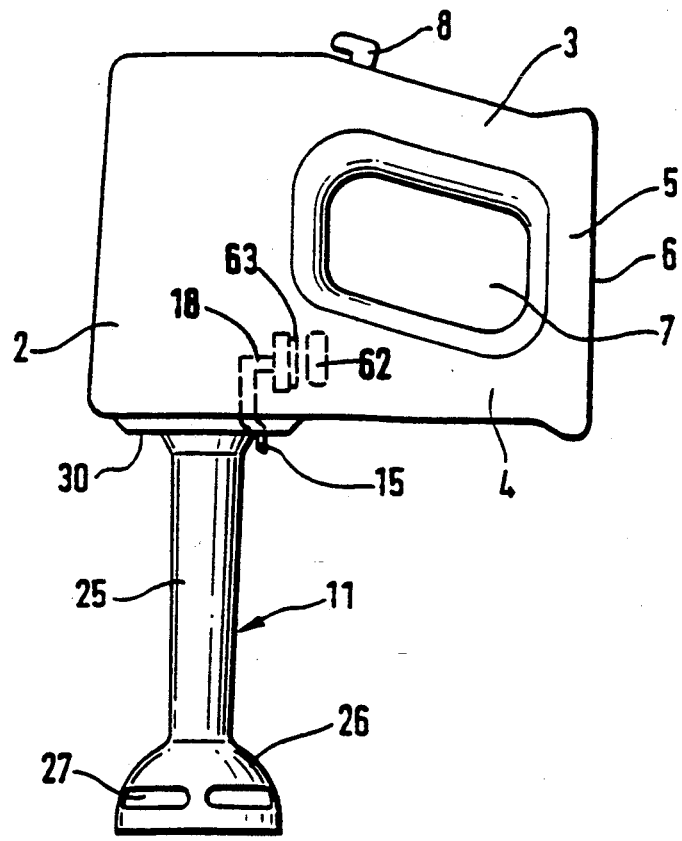
FIG. 6 is a side view of the hand mixer with an inserted blending attachment.

According to FIG. 1 hand mixer 1 is provided with a dough hook 10, whereas FIG. 6 shows the hand mixer with a blending attachment 11. Various coupling devices (not shown) are provided in the motor casing 2 for receiving the blending attachment 11 or the dough hook 10. The drive shafts (not shown) of the coupling devices are connected through a gear arrangement (not shown) with the electric motor (not shown), i.e., during the operation of the hand mixer the coupling devices for the dough hook 10/beater (not shown) or for the blending attachment 11 are provided with different speeds at the same speed of the motor, so that the dough hook rotates at a lower speed, the beater rotates at a higher speed and the tool 60—FIG. 5 of the blending attachment 11 rotates at the highest speed. Thus, for example, the coupling devices for receiving a blending attachment or a beater or a dough hook may be arranged in the casing of the hand mixer in such a way that they extend concentrically to one another and that they are accessible from the outside through a common opening, as is described and shown in DE-33 06 989 A1. When using three different tools (beater, dough hook and blending attachment) it is often difficult to connect them through a common opening with three coupling devices operating at different speeds, because they would also have to extend coaxially to one another. Therefore it is advisable to arrange a further coupling device which is separated from the two coupling devices extending coaxially to one another. The blending attachment can be coupled with said further coupling device through an additional opening. If, however, only a double coupling device is selected for a dough hook/beater and a blending attachment, they can be arranged as is shown, for example, in the above-mentioned German specification (DE-33 06 989) or the above-mentioned Krups hand mixer.

Figure 3:
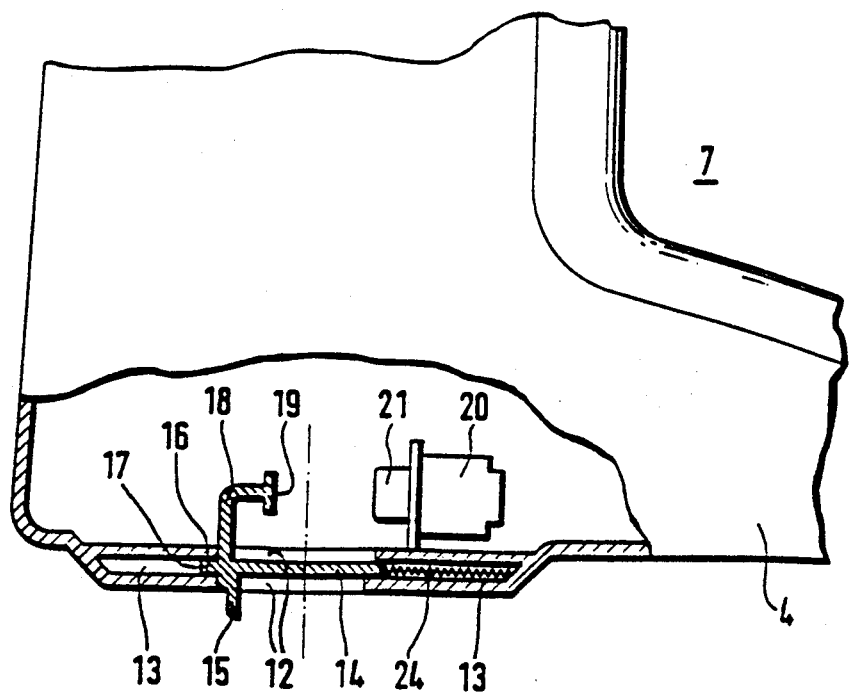
FIG. 3 is a partial view of the section of the casing receiving the blending attachment with the flap closed.
Figure 4:
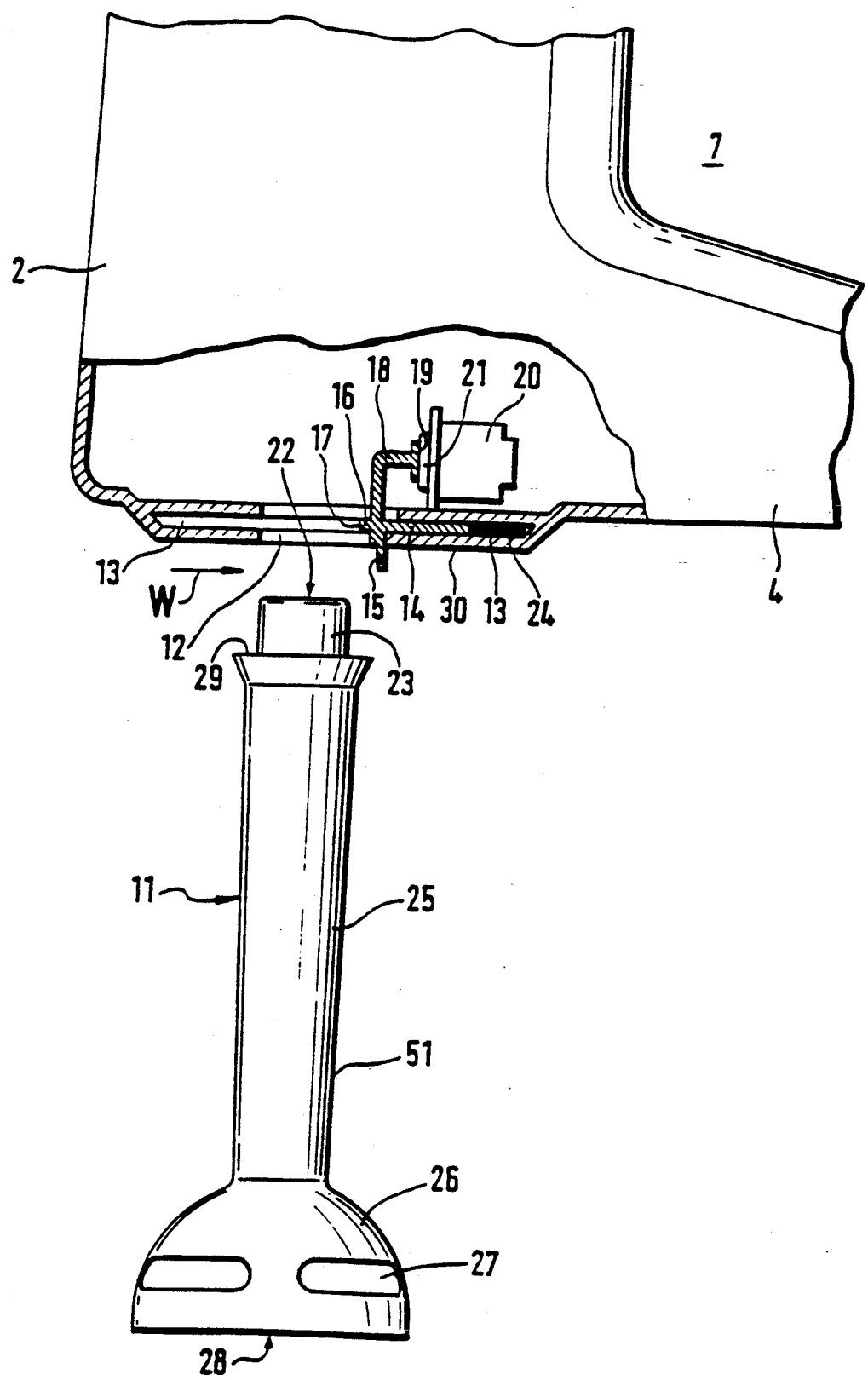
FIG. 4 is a representation as in FIG. 3 with the flap open shortly before the insertion of the blending attachment.

FIGS. 3 to 5 show the individual mounting steps for mounting the blending attachment 11 in the opening 12 provided for this purpose. In FIG. 3 opening 12 is closed by a flap 14 which is displaceable in a guide bar bracket 13 vertical to the direction of displacement Z (FIG. 5). The guide bar bracket 13 is provided on the left and on the right of opening 12 in motor casing 2. Flap 14 comprises an actuating pin 15 projecting from motor casing 2, which pin sits close to the left edge of opening 12 when it closes opening 12. To ensure the tight closure of opening 12, a projection 16 extends into the left guide bar bracket 13 whose circumferential surface 17 extends parallel to the shell of opening 12.

In FIGS. 3 to 5 an elbow 18 is formed on projection 16 and provided opposite of projection 16 in the interior of motor casing 2, the free end of said elbow being provided with a face 19 which, during the movement of the flap 14 towards the right, touches an actuating element 21 arranged in form of an actuating button and being provided on a switch 20 and which, during the further displacement of flap 14, moves element 21 so far towards switch 20 until the contacts provided in switch 20 are separated from one another (see also the broken line shown in FIG. 7).

In FIGS. 4 to 6 the blending attachment 11 consists of a casing 25 made of plastic which comprises a tube section 23 at its one end 22 from which there projects a driving shaft 59, which shaft 59 is connected with a coupling device 58 of the drive gear 57. As soon as the opening 12 is released after displacement of the flap 14 in the direction W, blending attachment 11 with its tube section 23 can be inserted into the opening 12, which leads to the position shown in FIG. 5. Here, the projection 16 sits close to the shell casing of tube section 23, so that flap 14 is held in its opened position. To ensure that after the extraction of the blending attachment 11 from opening 12 it is closed again, a spring 24 is provided in guide bar bracket 13, which spring is pretensioned by the opened opening 12 of flap 14 in such a way that it automatically flips back to the closing position as shown in FIG. 3 after the removal of blending attachment 11.

In FIGS. 4 to 6 the blending attachment consists of a tube-like shaft housing 51. At the free end of said shaft there is provided a bell 26 which is open at its bottom side and which is provided with slots 27 extending along its circumference. The rotatably held driving shaft 59 extends in shaft housing 51, which ends in knife-like tools 60 in said bell 26. Shaft housing 51 is used as fixing device for the driving shaft 59 and it ensures the deepest possible penetration into a vessel in which foodstuffs are comminuted by means of the knife-like tools 60.

As shown in FIGS. 4 to 6, the bell 26 protects the outside from the knife-like tools 60 and thus prevents injuries in the event of improper use such as moving the hand from the outside laterally towards the bell 26. However, concerning such a mixer or blending attachment 11 there is still the possibility that the fingers of a user may inadvertently move into the opening 28 of bell 26 from below, so that the fingers come into contact with the knife-like tools 60 provided in the bell and thus are injured. The knife-like tools 60 rotating in bell 26 are covered by bell 26. As shown in FIGS. 4 to 6, bell 26 is additionally provided with horizontally extending slots 27, which allow the foodstuffs to exit radially at this position during the mixing and comminution process.

As shown in FIGS. 4 and 5, a step 29 follows the tube section, which step, as is clearly shown in FIG. 5, comes to sit close to lower side 30 when the blending attachment is properly inserted into the coupling device 58 of hand mixer 1. Step 29 thus limits the movement of the blending attachment 11 towards the hand mixer 1. As is also clearly shown in FIG. 5, the shell casing of tube section 23 forms the stop for the projection 16 of elbow 18, so that the face of elbow 18 holds the actuating element 21 in the position in which the switch 20 is opened.

FIG. 7 schematically shows the electric diagram with its function according to the invention. The points designated with reference numerals 31 and 32 are the connecting poles of an electric plug (not shown) which can be connected to an electric power source. The line 33 leading away from connecting pole 31 leads to a five-step switch 9 comprising a slide contact 34 moveable in the direction Y, which contact is connectable with five opposite contacts 35 to 39. In the position of slide contact 34 as is shown in FIG. 7, the slide contact is connected with contact 36 which represents the O-position of hand mixer 1, because it does not have any connection via the electric motor 40 to connecting pole 32. Contact 37 is connected with the electromotor 40 via line 41, which is connected to connecting pole 32 via line 42. An electric component 43 is interposed in line 41. A further line 44 leads away from contact 38, which line is connected behind component 43 with line 41 at point 53. A further electric component 45 is interposed in line 44. A further line 46 leads away from contact 39 to line 41 behind components 43, 45 at point 52. Components 43, 45 reduce the speed of the electromotor 40 to a different extent. In the simplest case, these may concern drop resistors with different resistance values.

FIG. 7 shows switch 20 which is disposed within line 41 behind components 43, 45 and line 44 and which can be actuated by elbow 18 (FIGS. 4 and 5), so that it is brought to its open position (as shown in FIG. 7 by the broken line). A further line 47, which is connected to contact 35, is connected to line 41 between switch 20 and electromotor 40 and forms the switch step for short-time operation in combination with slide contact 34.

The function of the hand mixer in accordance with the invention is as follows:

If, for example, dough is to be kneaded with the hand mixer in accordance with Fig. 1, the dough hook 10 is inserted into the opening provided for this purpose, which, for example, may also be opening 12, and displaced until a gearing acting as clutch and not shown in the drawing snaps into the pertinent clutch device and is torsionally rigidly connected with the driving shaft of the gear arrangement. After having coupled the dough hook 10, for example, with the coupling device through opening 12, it is necessary for flap 14 to be opened. However, due to the substantially smaller diameter of dough hook 10, which is preferably made of special steel, flap 14 with its projection 16 comes to sit close with the surface of the steel wire at such a position that the face 19 of elbow 18 does not touch the actuating element 21 of switch 20. Thus, switch 20 remains closed when one or two dough hooks or beaters are used, as is shown in FIG. 7. Due to the closed switch 20 it is possible to switch on all five switch steps, which leads to the fact that the speed of electromotor 40 and thus that of the dough hooks can be variable as defined the drop resistors 43, 45 in steps I and II. When using step III, the electromotor 40, and thus the dough hooks, rotates at the highest speed because no drop resistor has been provided in line 46.

Because the slide contact 34 (FIG. 7) connected with the actuating member 8 locks rigidly into steps I, II and III, the motor continues to operate in these three positions until the actuating member 8 is displaced to another position, i.e., also to the O-position. If the actuating member is displaced to step IL, it is necessary to hold said member at this position against the force of a spring 61 by hand. As soon as the hand moves away from actuating member 8, the actuating member automatically returns to the O-position (short-time operation) by the force of the spring 61.

If a blending or mixing attachment provided with a rotating knife 60 is inserted into the opening 10 after opening flap 14, it is necessary, as is shown in FIGS. 4 and 5, to displace flap 14 as far as possible to the right (which should take place before the coupling 58 provided at the upper end of the driving shaft 59 for the knife-like tool 60 locks with the coupling device of the gear device 57 connected with the electromotor) until the face 19 of elbow 18 displaces the actuating element 21 towards switch 20, which causes said switch to move to the open position (FIG. 7). This measure interrupts line 33 from the connecting pole 31 via the five-step switch and line 41 up to point 48. In this position it is possible to connect the contacts 37, 38 and 39 with the slide contact 34. However, current will not flow to electromotor 40, so that if one of the three permanent-operation switch steps I to III is selected, the electromotor 40 cannot be put into operation.

If, in accordance with FIG. 7, the slide switch 34 is moved against the force of spring 61 towards the switch position IL, current will flow from connecting pole 31 via line 33 to the slide contact 34. From there it will flow to contact 35 via line 47 to connecting point 48. From there it will flow via the end piece of line 41 to the electromotor 40 and on through line 42 to connecting pole 32. The electromotor 40 is switched on and rotates at maximum nominal speed which is transmitted either directly or via an interposed gear onto the coupling device and from there via the driving shaft 59 disposed in shaft housing 25 onto the tools 60 provided in bell 26.

As soon as the user's finger moves away from the slide contact 34, it automatically returns, to the O-position and the knife-like tool 60 instantly comes to a standstill. The safety device as provided by the invention therefore only allows switching on the short-time operation step IL when using a blending or mixing attachment provided with a knife-like tool, so that whenever the hand inadvertently moves into bell 26 with simultaneous release of actuating member 8, the step switch automatically returns to its O-position, which causes the electromotor 40 and thus the knife-like tool 60 to come to a standstill. This helps to prevent major injuries.

We claim:

1. Electrically driven hand mixer for processing foodstuffs, comprising housing structure, said housing structure defining an opening, spring structure adjacent said opening, an electromotor in said housing structure, a manually actuated switching device for setting said electromotor into operation and having a switch step for permanent operation of said electromotor and a switch stage (IL) which, causes said electromotor to remain in operation only as long as said switch stage (IL) remains manually actuated, coupling structure in said housing structure for holding and driving an insertable knife-like tool, and interlock means responsive to insertion of said knife-like tool into said coupling structure for preventing connection of said electromotor with a power supply despite activation of said switch step for permanent operation, while allowing said electromotor to be connected with said power supply when said switch stage (IL) is manually actuated, said interlock means including an electric switch for connecting said electromotor with said power supply, said electric switch having an actuating element, said coupling structure being externally accessible through said opening and a flap adapted to close said opening by force of said spring structure, such that, during the insertion of said tool into said opening, said flap is displaced such that said flap actuates said actuating element to open said electric switch.

2. Hand mixer of claim 1 wherein the opening of said electric switch during the insertion of said knife-like tool takes place before mechanical connection of said tool with said coupling structure.

3. Hand mixer of claim 1 and further including stop structure on said tool which, during insertion of said tool into said coupling structure, displaces said actuating element.

4. Hand mixer of claim 3 wherein said knife-like tool is a blending attachment that includes a driving shaft rotatably held in rod-like casing structure with cover structure extending in a bell-like manner at the bottom end of said casing structure and said stop structure is formed by tube-like sleeve structure on said casing structure, said shaft having at the end remote from said cover structure a torsionally rigid coupling member for engagement with said coupling structure and at its other end radially extending knife blade structure, said blade structure being protected from the outside by said cover structure.

5. Hand mixer of claim 1 wherein said knife-like tool is a blending attachment that includes a driving shaft rotatably held in rod-like casing structure with cover structure extending in a bell-like manner at the bottom end of said casing structure and tube-like sleeve structure on said casing structure, said shaft having at the end remote from said cover structure a torsionally rigid coupling member for engagement with said coupling structure and at its other end radially extending knife blade structure, said blade structure being protected from the outside by said cover structure.

6. Hand mixer of claim 1 wherein said housing structure includes guide bar bracket structure and said flap is slidably displaceable in said guide bar bracket structure against the force of said spring structure in a direction transverse to the insertion direction of said tool.

7. Hand mixer of claim 6 wherein said mixer includes an electric circuit for connecting said electromotor with said power supply, and said electric switch is closed when said knife-like tool is not inserted into said coupling structure to complete said electric circuit and said electric switch is opened when said knife-like tool is inserted into said coupling structure.

8. Hand mixer of claim 7 and further including stop structure on said tool which, during insertion of said tool into said coupling structure, displaces said actuating element.

9. Hand mixer of claim 8 wherein said tool is a blending attachment that includes a driving shaft rotatably held in rod-like casing structure with cover structure extending in a bell-like manner at the bottom end of said casing structure and said stop structure is formed by tube-like sleeve structure on said casing structure, said shaft having at the end remote from said cover structure a torsionally rigid coupling member for engagement with said coupling structure and at its other end radially extending knife blade structure, said blade structure being protected from the outside by said cover structure.

10. Electrically driven hand mixer for processing foodstuffs, comprising
  housing structure, said housing structure defining an opening, spring structure adjacent said opening, coupling structure in said housing structure for holding and driving an insertable knife-like tool, an electromotor in said housing structure, a manually actuated switching device for setting said electromotor into operation and having a switch step for permanent operation of said electromotor and a switch stage (IL) which, causes said electromotor to remain in operation only as long as said switch stage (IL) remains manually actuated, said knife-like tool being a blending attachment that includes a driving shaft rotatably held in rod-like casing structure with cover structure extending in a bell-like manner at the bottom end of said casing structure and stop structure formed by tube-like sleeve structure on said casing structure, said shaft having at the end remote from said cover structure a torsionally rigid coupling member for engagement with said coupling structure and at its other end radially extending knife blade structure, said blade structure being protected from the outside by said cover structure, interlock means responsive to insertion of said knife-like tool into said coupling structure for preventing connection of said electromotor with a power supply despite activation of said switch step for permanent operation, while allowing said electromotor to be connected with said power supply when said switch stage (IL) is manually actuated, said interlock means including an electric switch for connecting said electromotor with said power supply, said electric switch having an actuating element, said coupling structure being externally accessible through said opening, and a flap adapted to close said opening by force of said spring structure, such that, said stop structure, during insertion of said tool into said opening, displaces said flap such that said flap actuates said actuating element of said electric switch.

11. Hand mixer of claim 10 wherein said flap is adapted to be displaced by hand and said sleeve structure is adapted to keep said flap open after the introduction of said casing structure into said opening.

12. Hand mixer of claim 11 wherein said housing structure includes guide bar bracket structure and said flap is slidably displaceable in said guide bar bracket structure against the force of said spring structure in a direction transverse to the insertion direction of said tool.

* * * * *